(12) United States Patent  (10) Patent No.: US 8,074,204 B2
Comstock et al.  (45) Date of Patent: Dec. 6, 2011

(54) TEST AUTOMATION FOR BUSINESS APPLICATIONS

(75) Inventors: Jeff Comstock, Hellerup (DK); David Pokluda, Redmond, WA (US); Ashok Srinivasan, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1404 days.

(21) Appl. No.: 11/562,190

(22) Filed: Nov. 21, 2006

(65) Prior Publication Data

US 2008/0120602 A1 May 22, 2008

(51) Int. Cl.
G06F 9/45 (2006.01)
(52) U.S. Cl. ....................................... 717/125
(58) Field of Classification Search .................. 717/125
See application file for complete search history.

(56) References Cited

U.S. PATENT DOCUMENTS

| 7,062,753 | B1 | 6/2006 | Ward et al. | |
|---|---|---|---|---|
| 7,272,822 | B1 * | 9/2007 | Riggins et al. | 717/124 |
| 7,694,181 | B2 * | 4/2010 | Noller et al. | 714/38.11 |
| 2004/0103396 | A1 | 5/2004 | Nehab | |
| 2004/0133880 | A1 | 7/2004 | Paternostro et al. | |
| 2004/0193940 | A1 | 9/2004 | Snyder et al. | |
| 2005/0166094 | A1 | 7/2005 | Blackwell et al. | |
| 2005/0193266 | A1 * | 9/2005 | Subramanian et al. | 714/38 |
| 2005/0204201 | A1 | 9/2005 | Meenakshisundaram et al. | |
| 2005/0256665 | A1 | 11/2005 | Hartmann et al. | |
| 2006/0026506 | A1 | 2/2006 | Kristiansen et al. | |
| 2006/0161833 | A1 | 7/2006 | Chandra et al. | |
| 2007/0234293 | A1 * | 10/2007 | Noller et al. | 717/124 |
| 2007/0234314 | A1 * | 10/2007 | Godwin et al. | 717/136 |

OTHER PUBLICATIONS

U.S. Appl. No. 11/541,473, Ferren et al.
U.S. Appl. No. 11/541,450, Ferren et al.
U.S. Appl. No. 11/540,910, Ferren et al.
U.S. Appl. No. 11/526,145, Ferren et al.
U.S. Appl. No. 11/364,573, Ferren et al.
U.S. Appl. No. 11/364,131, Ferren et al.
U.S. Appl. No. 11/364,130, Ferren et al.
U.S. Appl. No. 11/343,927, Ferren et al.
U.S. Appl. No. 11/343,745, Ferren et al.
U.S. Appl. No. 11/324,174, Ferren et al.
U.S. Appl. No. 11/292,323, Ferren et al.
U.S. Appl. No. 11/292,296, Ferren et al.
U.S. Appl. No. 11/292,207, Ferren et al.
U.S. Appl. No. 11/291,503, Ferren et al.
U.S. Appl. No. 11/214,459, Ferren et al.
U.S. Appl. No. 11/214,458, Ferren et al.
U.S. Appl. No. 11/214,449, Ferren et al.
"iTKO LISA™ 3 for J2EE", iTKO, Inc., 2006, http://www.itko.com/site/docs/LISA3_for_J2EE.pdf#search=%22Unit%20Testing%20J2EE%20applications%20pdf%22.

(Continued)

*Primary Examiner* — John Chavis
(74) *Attorney, Agent, or Firm* — Turk IP Law, LLC (57) ABSTRACT

A test framework suited for use with distributed business applications allows developers to specify a test, or suite of tests, to be easily selected and executed. Execution of a test suite instantiates objects such as a test runner and a test result object that set up, activate, and observe a test cycle. Results may be forwarded to a variety of special-purpose listeners which evaluate variable and state changes and ultimately determine pass/fail metrics. Results from profilers may be used to determine code coverage for each of the tests performed by the suite. APIs allow integration of the test framework with other development processes such as a be source code management system. In one embodiment, new or changed source code may not be checked in until successfully passing a test cycle.

20 Claims, 6 Drawing Sheets

OTHER PUBLICATIONS

Wittevrongel et al., "SCENTOR: Scenario-Based Testing of E-Business Applications", IEEE, 2001, http://csdl2.computer.org/persagen/DLAbsToc.jsp?resourcePath=/dl/proceedings/&toc=comp/proceedings/wetice/2001/1269/00/1269toc.xml&DOI=10.1109/ENABL.2001.953386#search=%22IEEE%20unit%20test%20business%20application%22.

Xie et al., "Tool-Assisted Unit Test Selection Based on Operational Violations", IEEE, 2003. http://ieeexplore.ieee.org/iel5/8780/27811/01240293.pdf?isNumber=.

Mayer et al., "Towards a BPEL unit testing framework", ACM, 2006, http://portal.acm.org/citation.cfm?id=1145723&coll=ACM&dI=ACM&CFID=183132&CFTOKEN=29586780.

Albonesi, David H., "Dynamic IPC/Clock Rate Optimization", 1998, pp. 282-292, 25$^{th}$ International Symposium on Computer Architecture, IEEE Computer Society.

Balasubramonian, Rajeev; Albonesi, David; Buyuktosunoglu, Alper; Dwarkadas, Sandhya, "Dynamic Memory Hierarchy Performance Optimization", 2000, pp. 1-11, IEEE.

Balasubramonian, Rajeev; Albonesi, David; Buyuktosunoglu, Alper; Dwarkadas, Sandhya, "Memory Hierarchy Reconfiguration for Energy and Performance in General-Purpose Processor Architectures", 2000, pp. 1-13, IEEE.

Juan, Toni; Sanjeevan, Sanji; Navarro, Juan J., "Dynamic History-Length Fitting: A Third Level Of Adaptivity For-Branch Prediction", bearing a date of 1998, pp. 155-166, IEEE.

Veidenbaum, Alexander V.; Tang, Weiyu; Gupta, Rajesh; Nicolau, Alexandru; Ji, Xiaomei, "Adapting Cache Line Size to Application Behavior", 1999, pp. 145-154, 13$^{th}$ International Conference on Supercomputing, ACM Press.

* cited by examiner

TEST AUTOMATION FOR BUSINESS APPLICATIONS

BACKGROUND

The development and execution of tests for business applications is often significantly more difficult than testing of singular software applications. Even the term business application is somewhat of a misnomer, because most business applications are actually a number of different applications, even running on separate computers. Business applications often are composed of separate applications running on separate machines, connected by self-defined data traffic, such as XML.

The separate functions that compose a business application, also known as an Enterprise Resource Planning (ERP) application, may include authentication, authorization, memory management, and transaction support. Individual tests of the various component functions may reveal logic errors, memory leaks, or other defects in the code, but the interactions between components may cause unpredictable errors and unwanted side effects.

Manually developing application-level tests is difficult and time consuming, especially when the number of conditions to satisfy for simulation of a production environment may be difficult to reproduce consistently. Further, when hundreds, or even thousands, of class modules are involved, even unchanged modules may exhibit errors or performance changes when changes are made to connected modules. Ensuring that each class module is fully vetted before being released to production can be as time consuming as authoring the original code.

SUMMARY

An automated test environment automatically generates system-level tests by merging test metadata and specific test data to drive a business application in an actual-use environment and monitors results. The results are compiled and presented using a simple 'test dashboard' to allow review of results and comparison of current results to previous tests or even to live activity. A variety of listeners may receive test results and store them in corresponding formats for analysis. For example, there may be a database listener, a file system listener, an XML listener, or a memory listener, to name a few.

Tests or suites of tests may be selected to cover a range of complexity, for example, a transaction test may be performed on a web-services database update or an entire company may be simulated to test a full range of business functions. An individual test or a suite of test may be outlined using metadata to define test functionality. Test criteria or test data that define specific conditions, such as actual input values, may be merged with the metadata to allow generation of specific tests. Because the test code may be consistently generated, elaborate versioning of manually prepared tests is not required when trying to maintain test repeatability.

A test runner module may be spawned to provide test stimulus and overall control of test activities. Output corresponding to test stimulus may be directed to the various listeners to determine whether the result is acceptable (pass) or unacceptable (fail). Pass/fail results may be categorized and displayed using a results console or the test dashboard.

Code classes may be screened to determine the percentage of code tested by each test instance. Code coverage metrics may be established as part of the requirements for code release. Acceptable code coverage and pass/fail results, or both, may be used to accept or reject the tested code class for release into a code management system. By interconnecting the automated test environment and the code management system, attempts to check-in new or edited code may automatically launch a build and test process. Successful completion of the build and test process may be required before the new or edited code is checked-in.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
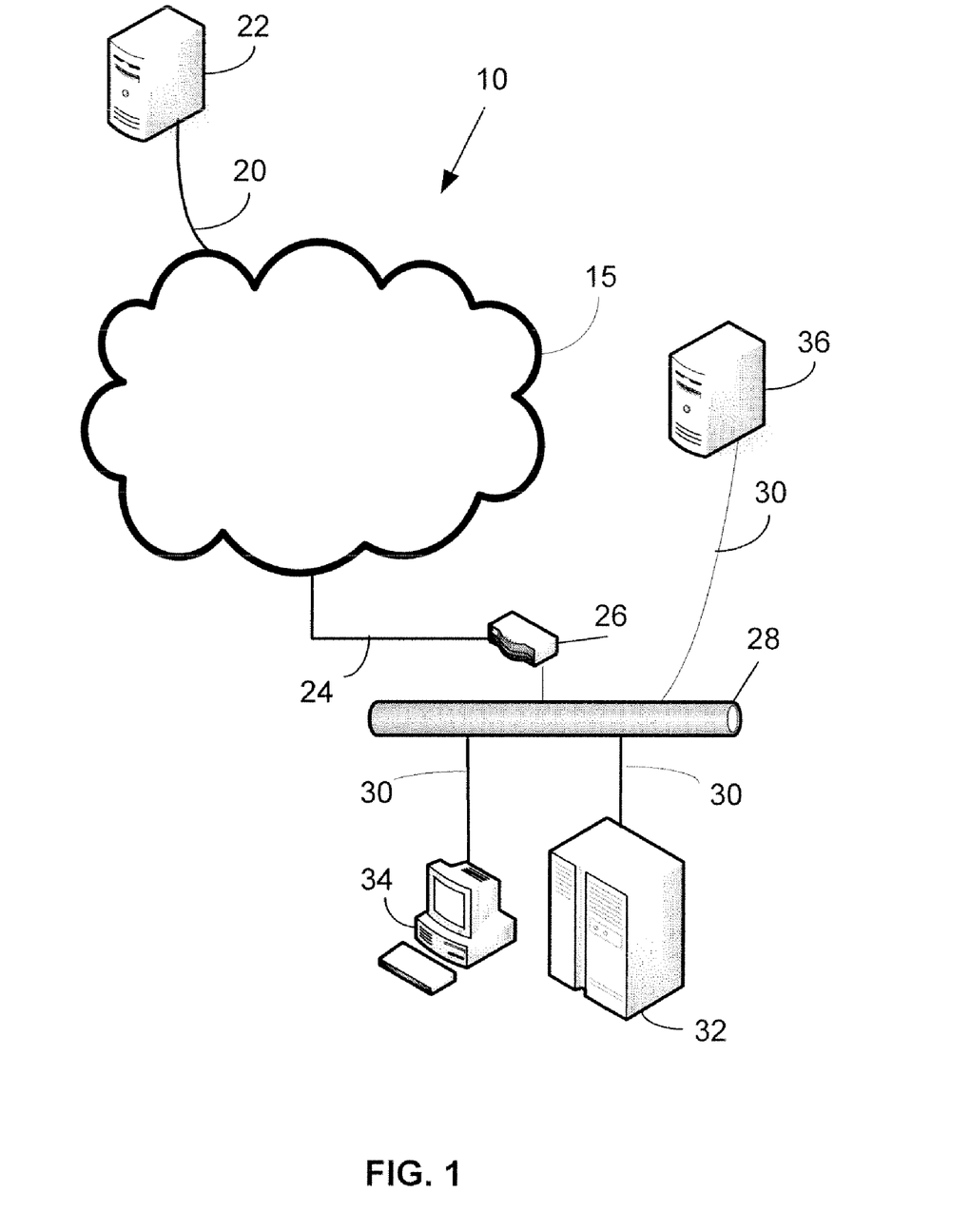
FIG. 1 is a simplified and representative network.

FIG. 1 illustrates a network environment 10 that may be used in transacting electronic business, and, as such, hosting an automated test framework for business applications. A network cloud 15 may support a wide area network connections, such as the Internet. A network 20 coupled to the network cloud 15 may connect an individual computer 22 that may be, for example, an electronic business transaction endpoint. Another network 24 may be coupled to the network cloud 15 and to a local area network 28 via a network interface 26. The network interface 26 may be a proxy server and may incorporate a firewall or other network security device. In another embodiment, the network interface 26 may be a simple data modem. Coupled to the local area network 28 may be a variety of individual subnets 30 coupled to a server 32 a personal computer 34 and an application server 36. The server 32 may also host business applications. In the description below, any of the computers 22, 32, 34, 36 may be valid hosts for business data testing.

Figure 2:
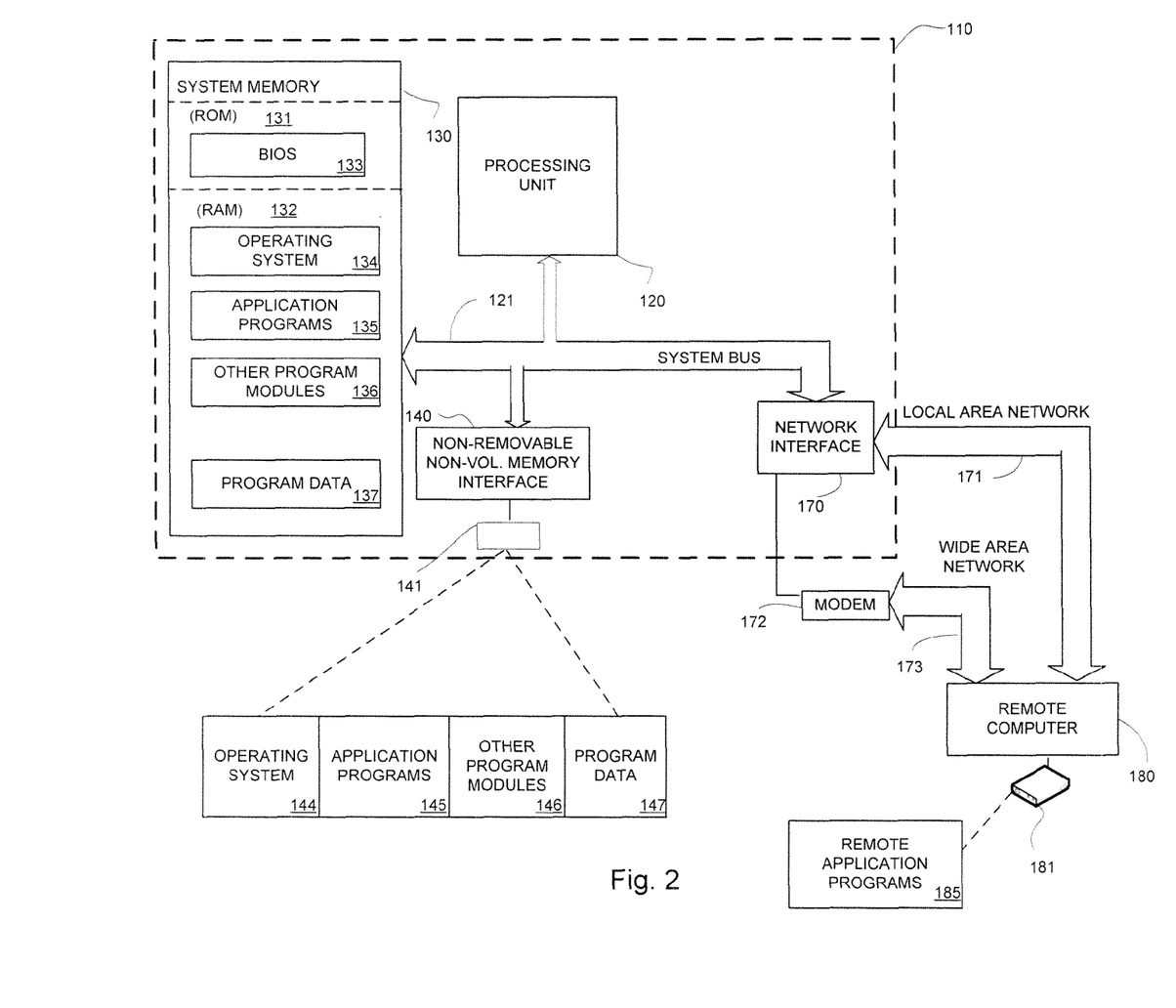
FIG. 2 is a simplified and representative block diagram of a computer suitable to implement an embodiment of test automation for a business application.

FIG. 2 illustrates a computing device in the form of a computer 110 that may host one or more of the embodiments of the current disclosure and is discussed in detail to provide a context for subsequent discussions.

Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 (telephone, cable, DSL, etc.) or other means for establishing communications over the WAN 173, such as the Internet. The modem 172, which may be internal or external, may be connected to the system bus 121, the network interface 170, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. Such remote application programs may include business systems involved in electronic business transactions as are discussed in more detail below. It will be appreciated that the network connections shown are exemplary and other means of establishing a communications link between the computers may be used.

Figure 3:
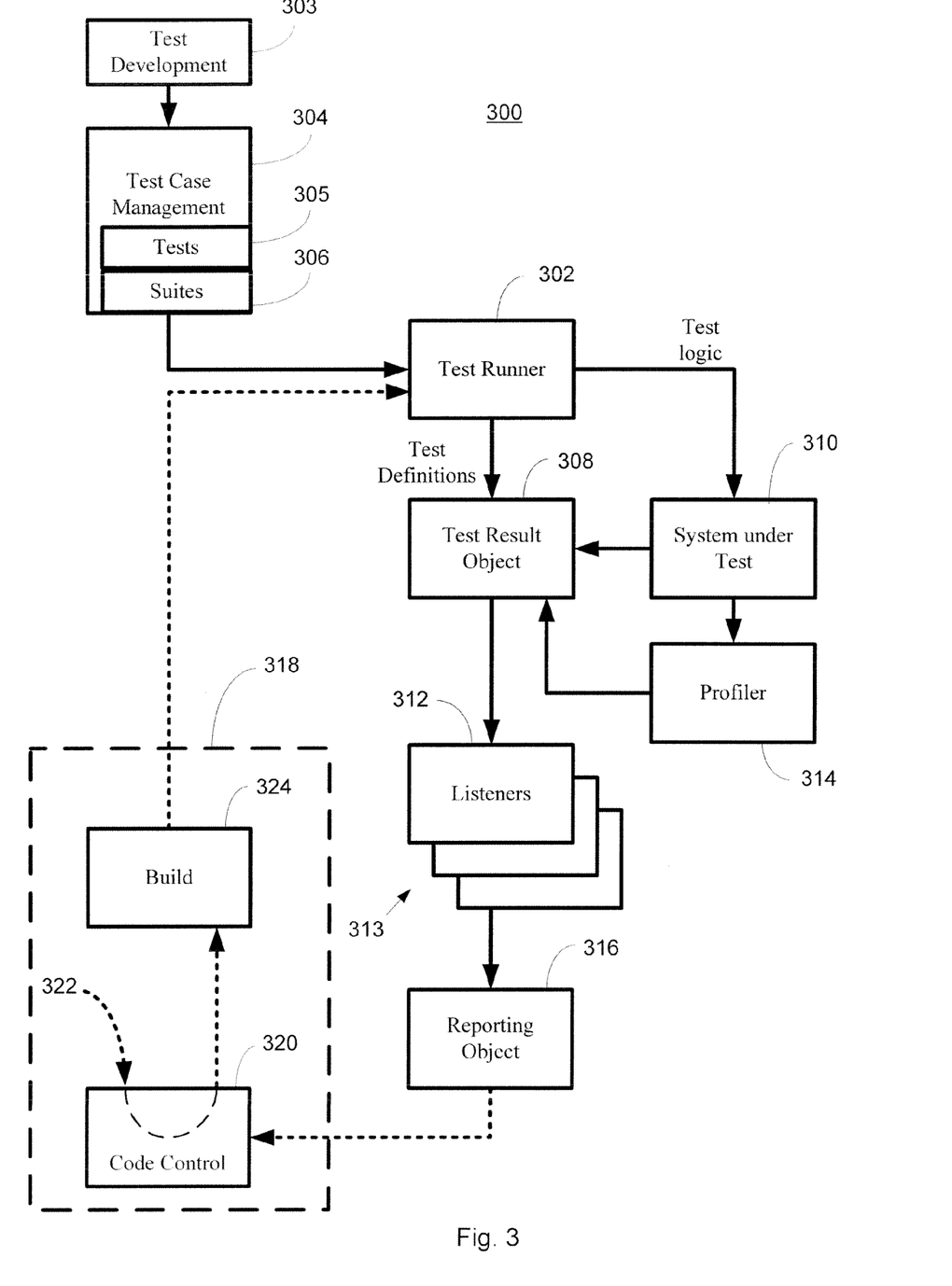
FIG. 3 is a block diagram of a representative business application test environment.

FIG. 3 is a block diagram of a representative business application test framework 300. The framework 300 may include a test runner 302, that acts as a central core to an automated test. Multiple runners may be instantiated. A simple runner is used to run tests and may support both a test tool bar and a test runner form. The test tool bar allows quick selection of a test or suite for execution. The test runner form allows list-style presentation of available tests and collated results. A console runner may be used by other tools to execute tests. An example of code management integration, discussed below, uses a console runner. An API runner allows custom runners to be built and executed.

Tests may be created and edited in a test development module 303. A test case management object 304 may be used to organize tests 305 by categories. A suite 306 may be a collection of tests that when performed together exercise a particular transaction or function. An individual suite may include actual tests 305, but in some embodiments, has metadata corresponding to tests 305 and the logic associated with execution of a particular test or compilation of tests. The metadata may be used to generate the respective tests when called by the test runner 302. A common class may be used to wrap multiple tests into a particular suite. The use of a common class, for example, a test_case class, allows reuse of some test infrastructure code, such as, data setup and teardown by all suites.

A test result object 308 may be responsible initializing the test execution context and starting and stopping a profiler object 314. The test result object 308 may then gather data from the testing process. Results may include value changes or events that occur during testing. When the result object 308 has the results, they may be passed to an appropriate listener 312, from a set of listeners 313, with each listener oriented to particular focus or function. The listeners have the purpose of persisting the data received in a corresponding format. For example, as mentioned above, listeners 313 may include a database listener to writes results to a database, or an XML listener that creates a corresponding XML file, or others as needed. In addition, the test result object 308 start a profiler object 314 at the beginning of a test. The profiler object 314 may monitor code execution by line of code. When the test is completed, the result object 308 may gather the code execution data from the profiler for use in building a code coverage metric for the test. The code coverage metric may determine a percentage of system-under-test 310 objects that have been exercised by the current test instance or run.

A reporting object 316 prepares result data and allows graphical presentation of results on a user interface (not depicted). In one embodiment, a user interface associated with the test runner 302 is used first for selecting tests or test suites and is then used to present results associated with the selected tests or suites.

In operation, a test object 305 or test suite object 306 may be developed in the test development object 303 and stored in the test case management system 304. The test runner 302 may be activated and present a user interface for selecting from the tests and suites available in the test case management system 304. Alternatively, the test runner 302 may be called and passed the test name/suite. Automatic activation is discussed in more detail below. The test runner 302 may determine a current context and begin execution of the testing operation. The test runner 302 may also determine a state of the system under test 310 and configure any required proxy entities, such as a test-only company participant. The test runner 302 may create a test result object 308 and pass the necessary test result attributes for managing results. The test result object 308 may evaluate the test result attributes determine which listeners 313 should be used for persisting result data.

When all configuration is completed, the test runner 302 may pass control to the suite 306 containing the test logic. As the test proceeds, changes in the system under test 310 are observed and may be passed to the test result object 308. Information from the test may be passed from the test result object 308 to the various listeners 313. The test result object 308 may also collect information from the profiler object 314 corresponding to code coverage.

When the test has completed, the test runner 302 ensures all the objects are finished and closes all resources. Test results may be gathered by the reporting object 316 and displayed on a user interface (not depicted). In one embodiment, results may be displayed on the test runner user interface, for example, a result for a test may be displayed on the same screen used to select the test.

A source code manager 318 may be optionally coupled to the test framework 300. A source code control interface 320 may receive code from a source 322 tagged for check-in to the source code manager 318. The source code control interface 320 may automatically perform a build of the code and any related modules at a build object 324. When the build is completed successfully, the test runner 320 may be activated and the appropriate test/suite identifier or identifiers passed to a test runner 302 constructor, responsible for launching the test runner 302. Test execution may proceed as described above. When the test is complete, the reporting object 316 may report the collated results to the code control interface 320. Various metrics may be set up to designate which tests must be passed, a number of tests that may fail, and a code coverage percentage that must be met in order to release the code. When each metric meets its respective criteria, the code may be released into a released area of the source code manager 318.

Because different tests require different environments for execution, the test development module 303 and the test case management object 304 may allow development and instantiation of tests written in either a proprietary business application language or directly to the system kernel. The choice of application or kernel test may be made at run-time using the test runner 302 interface or by passing the appropriate parameters to the test runner 302 constructor.

Figure 4:
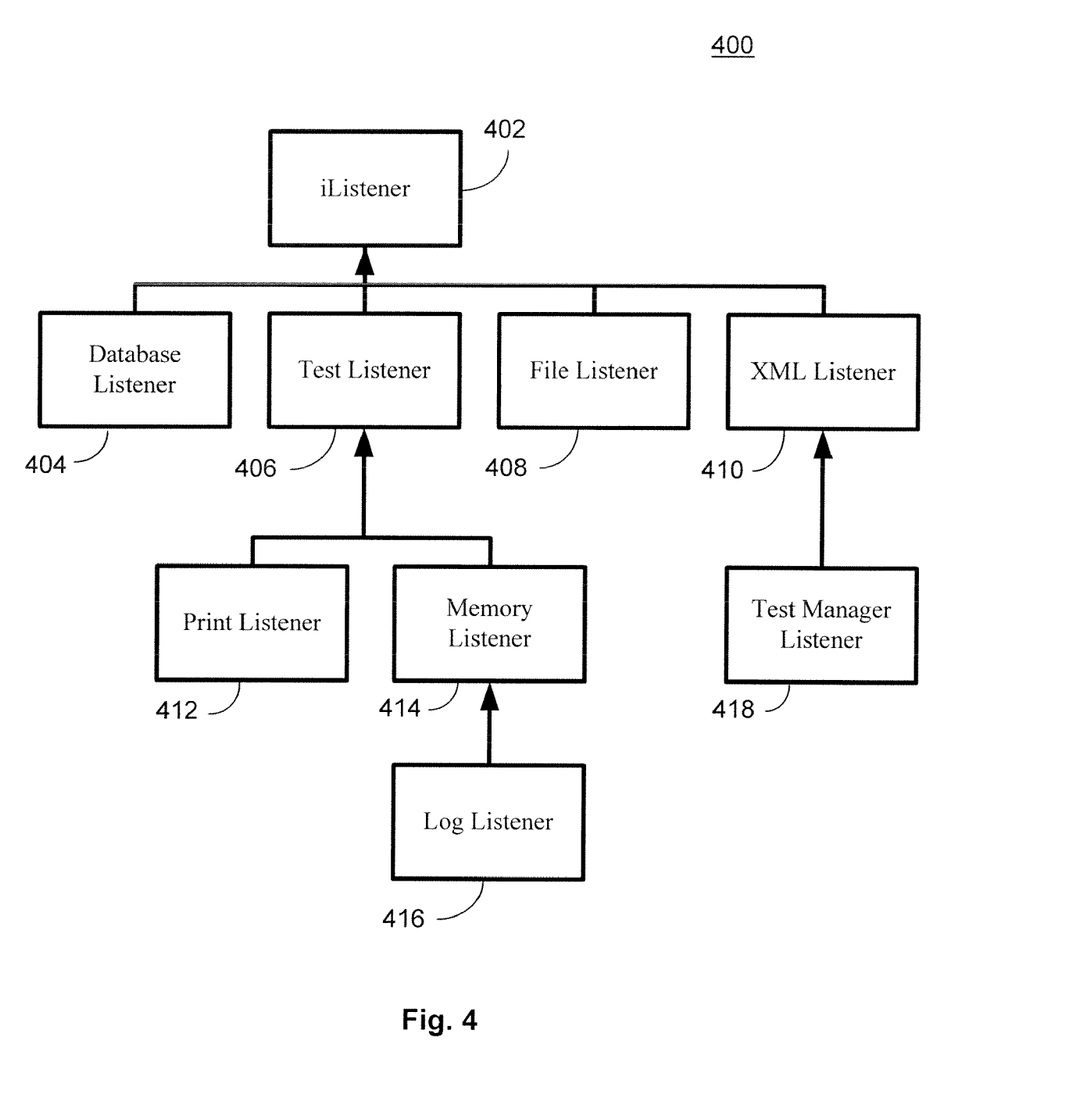
FIG. 4 is a method of executing an automated test for a business application.

FIG. 4 illustrates a hierarchical structure of listeners 400, such as listener set 313 of FIG. 3. Listeners are used to evaluate value change objects generated by the test result object 308. The listeners may acquire the value change objects in either a push or pull models. A test listener data interface may be used to pass value changes to listeners in the push model. A top-level listener 402 may have child listeners with specific functions. In the example of FIG. 4, child objects are a database listener 404, a test listener 406, a file listener 408 and an XML listener 410. In this example, the test listener 406 has child objects of a printer listener 412 and a memory listener 414. The memory listener has a log listener 416 as a child. The XML listener 410 may have child dedicated to a specific XML implementation, such as test manager listener 418. The test manager listener 418 may support a specific product, for example, Microsoft's Windows Test Tool (WTT).

Hierarchical organization of listeners allows simplified selection of a group of listeners, one selection may activate all listeners in the test category starting at test listener 406 and including its child objects 412, 414, and 416.

Figure 5:
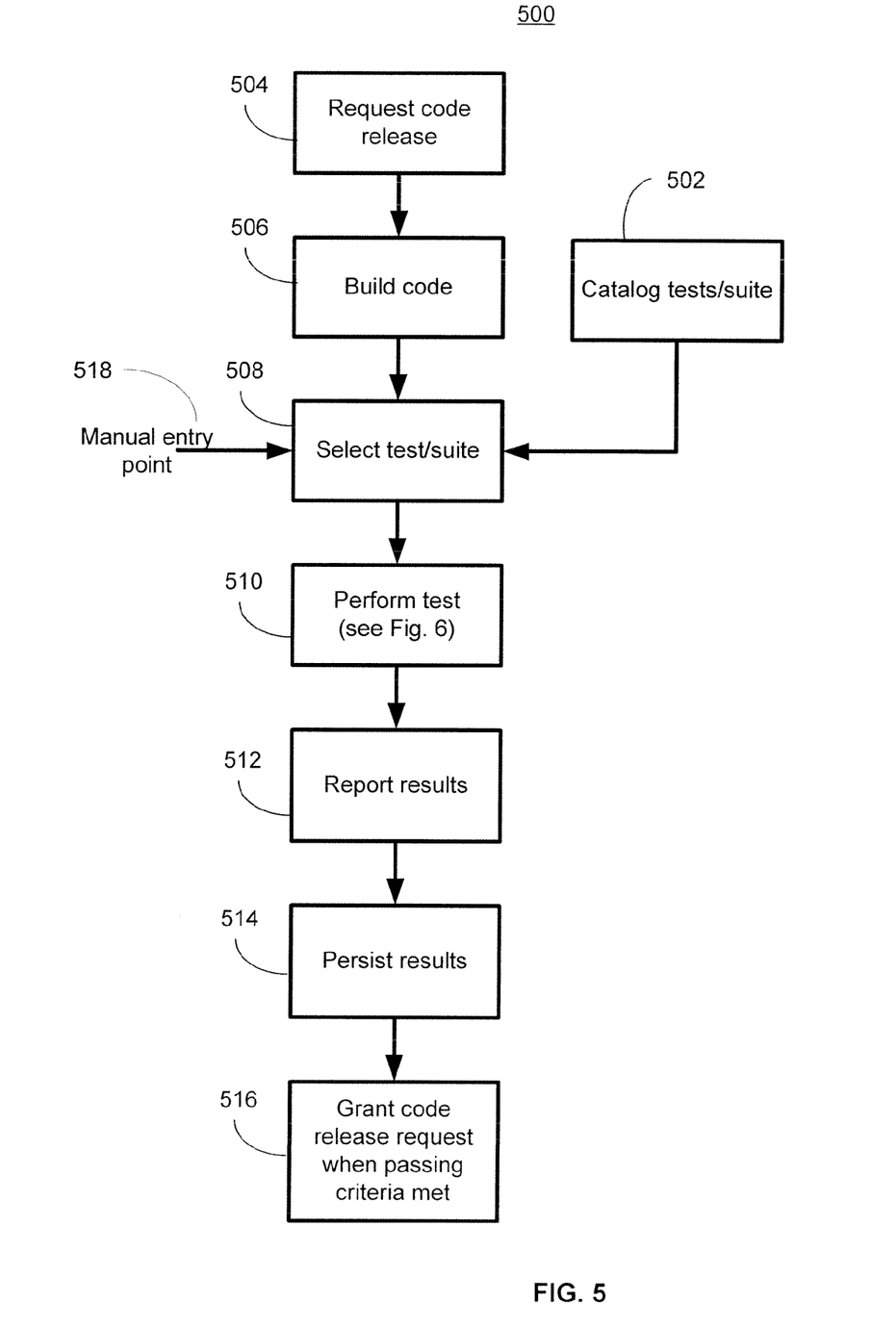
FIG. 5 is a detail of a portion of the method of FIG. 4.

FIG. 5, a method of performing a business application test is discussed and described. At block 502, one or more tests may be generated for use in validating the business application. The tests may be cataloged by purpose and type, and may be grouped by category for aid in identification and selection. A test may, most often, be a simple executable program, class, or module related to a specific business application condition. Test suites, that is, collections of tests and associated metadata related to test execution, may be similarly categorized and grouped. A test suite may explicitly include one or more tests, but also may simply have metadata pointing to the location of the test and additional metadata related to test sequence and test invocation points.

At block 504, a use of the test framework 300 of FIG. 3 for use in automated testing of new code begins when new code is presented for check-in and release. The request for check-in may begin in automated sequence of testing. The new code may be stored in a holding area pending a successful build and test sequence, as described below. At block 506, a build is performed incorporating the new code and any related code as designated in a code management system, such as code management system 318 of FIG. 3. Following the build, a trigger event may be sent to the test framework 300, and at block 508 a test or test suite selected from the catalog of tests developed at block 502 may be specified and any other run-time variables or instructions. The manual entry point 518 at block 508 also signifies the spot at which a user driven test may be initiated by selection of an individual test or test suite. In various embodiments, either a list of target modules to be tested, a list of tests or test suites, or both, may be presented for selection. Once target modules to be tested are selected, links or other metadata may be used to determine the appropriate tests for execution. After a selection is made, and a block 510, the requested testing may be performed. Test execution is covered separately and described below with respect to FIG. 6. Test execution at block 510 may yield both results of tests performed as well as code coverage for those tests.

At block 512 results from the test performed at block 510 may be reported. Results may be reported in a variety of manners, such as delivery of raw data, but often in a reduced form intended for human consumption. Results data may be summarized into a variety of reports, such as a warning report, an information report, a check-in validation report, and a normal test report. Results data may also be shown as a simple pass/fail metric, in one embodiment using simple green (pass) and red (fail) indicators. An electronic mail may also be launched, indicating the test is finished, and, if desired, the full or summarized results. The different reports may summarize aspects of test results related to the areas is titled. For example, a normal test report may simply be a report of all those tests which returned normal, or successful, results. A check-in validation report may be used to pass results to the code management system for determining when to check-in or release the new code from block 504.

When results are available, at block 514 those results may be persisted, or stored, for use in trend analysis, side-by-side test result comparisons, or comparison with live use of the business application.

At block 516, the request for code check-in may be granted when results meet conditions specified for code check-in. Conditions for code check-in may include minimum test results as well as minimum code coverage.

Figure 6:
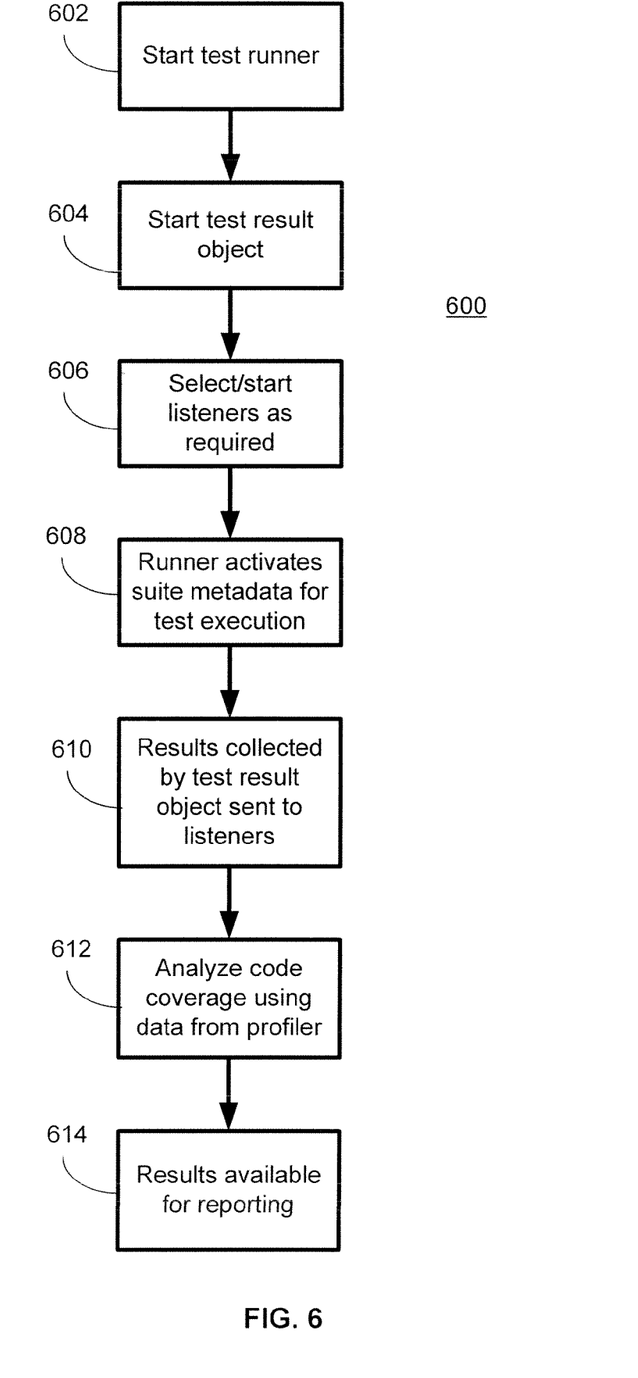
FIG. 6 is a method of executing a business application test.

FIG. 6 illustrates a method 600 of executing a business application test. The method 600 may detail activities associated with block 510 of FIG. 5. At block 602 a test runner 302 may be activated. As described above, the test runner 302 may use a test 305 or test suite 306 to develop a context for the test and ultimately pass control to the test suite metadata for running the test. At block 604, the test runner 302 may also activate a test result object 308 and pass information corresponding to the test to the test result object 308. At block 606 the test result object 308 may use the information passed from the test runner 302 to start, if necessary, and select the listeners necessary to capture test results. At block 608 the test runner 302 may pass control to logic in the test suite 306 responsible for performing the overall test.

At block 610, results, or observations about variable changes or state changes, collected by the test result object 308 may be made available to the appropriate listener. The data may be pushed to listeners using a listener interface, or may be pulled from the data result object by each respective listener. Results collected by the test result object 308 may include information from a profiler 314 at block 612 to be used for analysis of code coverage for the tests executed. At block 614, the results of the test may be made available for reporting. Results may include both details of specific tests and code coverage by class and by module.

Use of the integrated framework described above for performing business application testing accommodates many, if not all, of the unique elements to distinguish business applications from many other non-distributed applications. Tests may be generated from metadata, and tests may be wrapped in a suite to include metadata useful for driving its associated tests. The test runner may provide a single unified in a phrase for both selecting tests and viewing the results of those tests. Listeners may be distributed to persist information in different formats for use in preparing reports and statistical information. In another embodiment, the listeners may actually perform analysis or data reduction and rather than storing raw data, store reduced data. Further, the listeners may be organized hierarchically to allow easier selection and maintenance. APIs in the business application test framework further allow integration with other functions, such as integration with a code management system as described above, to allow a more test-driven development environment. Developers will see an immediate benefit from use of the test framework through its simple user interface and reporting of results, as well as e-mail reporting one link the test processes are engaged. Ultimately, resellers and end-users benefit from use of the test framework via more error-free code and quicker cycle time-to-market.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of testing a business application comprising:
    cataloging test classes and presenting the test classes using a test user interface;
    selecting at least one test class for execution;
    executing the at least one test class and collecting a test result;
    determining code coverage of the test result;
    creating a test listener;
    passing the test result to the test listener and creating a stored test result in a format corresponding to the test listener; and
    determining a pass/fail metric by analyzing the stored test result.

2. The method of claim 1, further comprising establishing at least one test runner for setting a test composition and results framework, the test runners comprising at least one of a user interface runner, a command line runner, and a program runner.

3. The method of claim 1, wherein cataloging test classes comprises wrapping tests and metadata into test suites.

4. The method of claim 1, wherein selecting at least one test class for execution comprises presenting a set of test classes with a test user interface.

5. The method of claim 1, wherein the business application is subject to source code control and the method further comprising releasing the business application to a next stage of source code control only when the pass/fail metric is a pass metric.

6. The method of claim 1, further comprising preparing a result report using one of a warning report, an information report, a check-in validation, and a normal test report.

7. The method of claim 1, further comprising determining a code coverage metric for the at least one test class selected for execution.

8. A computer-readable memory device having computer-executable instructions for executing a method of managing release of software for a business data system comprising:
  requesting release of a code version of the software;
  building an executable from the code version responsive to requesting the release of the code version;
  designating test code for performing a test on the executable;
  performing a test on the executable using the test code;
  collecting a result of the test;
  determining whether the result meets a criteria for passing the code version; and
  checking the code version into a code management system when the result meets the criteria for passing.

9. The computer-readable memory device of claim 8, wherein building the executable from the code version comprises building the executable from a holding area in the code management system.

10. The computer-readable memory device of claim 8, wherein executing the test comprises:
  retrieving a test case from a test management system;
  calling a test runner; and
  logging test data.

11. The computer-readable memory device of claim 8, wherein executing the test comprises:
  generating a test case from test metadata;
  calling a test runner; and
  logging test data.

12. The computer-readable memory device of claim 8, wherein collecting the result comprises:
  starting at least one listener, the at least one listener adapted to receive the result of the test;
  storing the result of the test in a format determined by a listener type; and
  sending an electronic mail to an electronic mail account designated to receive one of the result and a signal indicating the result is available.

13. The computer-readable memory device of claim 12, wherein the listener type comprises a database listener, a file listener, an XML listener, a print listener, a memory listener, and a disk listener.

14. The computer-readable memory device of claim 8, further comprising calculating a code coverage metric corresponding to a portion of the executable covered by the test.

15. The computer-readable memory device of claim 14, wherein calculating a code coverage metric comprises:
  executing a profiler that collects line execution data; and
  analyzing pro filer output to determine the code coverage.

16. A computing device for testing a business application, the computing device comprising:
  a memory;
  a data store;
  a processor coupled to the memory and the data store, the processor being arranged to execute a test environment coupled to a system of interconnected business tools operating to implement a business solution, the test environment comprising:
    a test suite object comprising test metadata and test executables;
    a test runner object that receives a selection of a test suite available at the test suite manager, determines test result attributes, and activates a test sequence;
    a test result object that receives and routes test observations to a listener object corresponding to the test result attributes;
    a reporting object for collating test results from the at least one listener; and
    a user interface object for displaying results.

17. The computing device of claim 16, wherein the test environment further comprises:
  a profiler object for extracting test data for determining code coverage.

18. The computing device of claim 16, wherein the test suite object generates the test sequence from the test executables and the test metadata for execution by the test runner object.

19. The computing device of claim 16, further comprising a source code control interface for allowing check-in of a component of one of the interconnected business tools only when a code coverage metric and a test result metric satisfy a predetermined criteria.

20. The computing device of claim 16, wherein the test runner object supports selecting at least one of a kernel test and a business language test.

\* \* \* \* \*